(12) United States Patent
Girvin et al.

(10) Patent No.: US 7,154,691 B2
(45) Date of Patent: Dec. 26, 2006

(54) MULTI-FORMAT THINFILM HEAD AND ASSOCIATED METHODS

(75) Inventors: Carolyn Girvin, Boulder, CO (US);
Lee Jaderborg, Frederick, CO (US);
Ming Ho Lau, Superior, CO (US);
Kenneth S. Franzel, Longmont, CO (US)

(73) Assignee: Quantum Corporation, San Jose, CA (US)

( * ) Notice: Subject to any disclaimer, the term of this patent is extended or adjusted under 35 U.S.C. 154(b) by 41 days.

(21) Appl. No.: 10/741,636

(22) Filed: Dec. 18, 2003

(65) Prior Publication Data
US 2005/0134989 A1 Jun. 23, 2005

(51) Int. Cl.
*G11B 5/29* (2006.01)

(52) U.S. Cl. .................. 360/61; 360/121; 360/122
(58) Field of Classification Search ........ 360/121–122; G11B 5/29, 5/31, 5/265, 5/187, 5/127
See application file for complete search history.

(56) References Cited

U.S. PATENT DOCUMENTS

| | | | |
|---|---|---|---|
| 3,643,037 A * | 2/1972 | Norwood | .................. 360/221 |
| 3,663,765 A | 5/1972 | Schneider | |
| 3,665,436 A | 5/1972 | Murray et al. | |
| 3,961,372 A | 6/1976 | Brock et al. | |
| 4,251,841 A | 2/1981 | Jacobs | |
| 4,300,179 A | 11/1981 | Barnes et al. | |
| 4,418,473 A | 12/1983 | Burkhart et al. | |
| 4,430,440 A | 2/1984 | Wada et al. | |
| 4,649,448 A | 3/1987 | Nakajima | |
| 4,650,774 A | 3/1987 | Kawaguchi et al. | |
| 4,686,596 A | 8/1987 | Kraemer et al. | |
| 4,695,909 A | 9/1987 | Momata et al. | |
| 4,709,284 A | 11/1987 | Endo et al. | |
| 4,814,915 A | 3/1989 | Wada et al. | |
| 4,835,640 A | 5/1989 | Endo et al. | |
| 4,868,697 A | 9/1989 | McClure | |
| 4,949,208 A | 8/1990 | Milo et al. | |
| 5,008,767 A | 4/1991 | Iwata et al. | |

(Continued)

FOREIGN PATENT DOCUMENTS

EP          0 437 147          7/1991

(Continued)

OTHER PUBLICATIONS

IBM (1976). "Magnetic Head Construction," *IBM Tech. Discl. Bulletin*, 19(2):397.

*Primary Examiner*—Andrea Wellington
*Assistant Examiner*—Dan I Davidson
(74) *Attorney, Agent, or Firm*—Morrison & Foerster LLP

(57) ABSTRACT

According to one aspect, an exemplary multi-format magneto resistive recording head is provided. The magnetic head includes a first set of data transducers configured transversely across a direction of tape transport, the first set of data transducers associated with a first data format, and a second set of data transducers configured transversely across the direction of tape transport, the second set of data transducers associated with a second data format, wherein the first set of data transducers and the second set of data transducers are separated by a distance along the direction of tape transport. In one example, the magnetic head includes a first raised elongated island positioned transversely across the direction of tape transport, the first island including the first set of data transducers, and a second raised elongated island positioned transversely across the direction of tape transport, the second island including the second set of data transducers.

29 Claims, 6 Drawing Sheets

U.S. PATENT DOCUMENTS

| | | | |
|---|---|---|---|
| 5,034,838 A * | 7/1991 | Brock et al. ............... 360/122 |
| 5,049,454 A | 9/1991 | Johnson et al. |
| 5,055,959 A | 10/1991 | Saliba |
| 5,065,500 A | 11/1991 | Yoneda et al. |
| 5,136,775 A | 8/1992 | Onoe et al. |
| 5,161,299 A | 11/1992 | Denison et al. |
| 5,426,551 A | 6/1995 | Saliba |
| 5,436,780 A | 7/1995 | Nagata et al. |
| 5,469,313 A | 11/1995 | Isozaki et al. |
| 5,475,553 A | 12/1995 | Saliba |
| 5,574,606 A | 11/1996 | Kimura |
| 5,602,704 A | 2/1997 | Gooch et al. |
| 5,663,856 A | 9/1997 | Packard |
| 5,737,152 A | 4/1998 | Balakrishman |
| 5,737,158 A | 4/1998 | Tanaka et al. |
| 5,751,527 A | 5/1998 | Sundaram et al. |
| 5,754,369 A | 5/1998 | Balakrishman |
| 5,771,142 A | 6/1998 | Maurice et al. |
| 5,862,014 A | 1/1999 | Nute |
| 5,883,770 A | 3/1999 | Biskeborn et al. |
| 5,905,613 A | 5/1999 | Biskeborn et al. |
| 5,953,184 A * | 9/1999 | Barber et al. ............... 360/121 |
| 5,963,401 A | 10/1999 | Dee et al. |
| 5,969,912 A | 10/1999 | Cope |
| 6,038,108 A * | 3/2000 | Dee et al. .................. 360/121 |
| 6,040,964 A | 3/2000 | Saliba |
| 6,188,532 B1 | 2/2001 | Albrecht et al. |
| 6,282,055 B1 | 8/2001 | Lakshmikumaran et al. |
| 6,369,982 B1 | 4/2002 | Saliba |
| 6,424,499 B1 | 7/2002 | Balakrishman et al. |
| 6,433,959 B1 * | 8/2002 | Lakshmikumaran et al. ............... 360/122 |
| 6,469,867 B1 | 10/2002 | Saliba |
| 6,577,470 B1 | 6/2003 | Rumpler |
| 6,587,305 B1 | 7/2003 | Saliba |
| 6,606,219 B1 | 8/2003 | Lam |
| 6,611,398 B1 | 8/2003 | Rumpler et al. |
| 6,690,542 B1 * | 2/2004 | Wang ................... 360/129 |
| 6,903,892 B1 * | 6/2005 | Cates ................... 360/53 |
| 6,927,937 B1 * | 8/2005 | Aoki ................... 360/122 |
| 6,937,435 B1 * | 8/2005 | Saliba ................... 360/122 |
| 2002/0141112 A1 | 10/2002 | Saliba |
| 2003/0076631 A1 | 4/2003 | Torline et al. |
| 2003/0214745 A1 | 11/2003 | Lau |

FOREIGN PATENT DOCUMENTS

| | | |
|---|---|---|
| EP | 0 439 943 | 8/1991 |
| EP | 0 469 618 | 2/1992 |
| EP | 0 550 890 | 7/1993 |
| EP | 0 590 701 | 4/1994 |
| EP | 0 710 392 | 5/1996 |
| JP | 62-259208 | 11/1987 |
| JP | 63-231707 | 9/1988 |
| JP | 3-141015 | 6/1991 |
| WO | WO 81/00780 | 3/1981 |
| WO | WO 89/06420 | 7/1989 |
| WO | WO 95/03606 | 2/1995 |

* cited by examiner

MULTI-FORMAT THINFILM HEAD AND ASSOCIATED METHODS

BACKGROUND

1. Field

The present invention relates generally to magnetic storage tape read and/or write heads, and more particularly to multi-format magnetic storage tape read and/or write heads.

2. Description of the Related Art

Magnetic storage tape continues to be an efficient and effective medium for data storage in computer systems. Increased data storage capacity and retrieval performance is desired of all commercially viable mass storage devices and media. In the case of linear tape recording, a popular trend is toward multi-head, multi-channel fixed head structures with narrowed recording gaps and data track widths so that many linear data tracks may be achieved on a tape medium of a predetermined width, such as one-half inch width tape. To increase the storage density and reduce access time of magnetic tapes, data tracks on the tape are arranged with greater density and the tape is streamed by a tape head at increasingly faster rates.

Magnetic tape heads typically include an active device region including raised strips or ridges, commonly referred to as islands, bumps, or rails, that provide a raised tape support or wear surface across which the magnetic tape advances. One or more of these raised islands includes embedded data transducers. The embedded transducers can be either a recording element for writing information to a magnetic tape or a reproducing element for reading information from a magnetic tape. An embedded recording element produces a magnetic field in the vicinity of a small gap in the core of the element, which causes information to be stored on a magnetic tape as the tape advances across the support surface. In contrast, a reproducing element detects a magnetic field from the surface of a magnetic tape as the tape advances over the support surface. Additionally, raised islands may be included without transducers to help support and guide the magnetic tape over the head, generally referred to as outriggers.

Typically, a plurality of embedded transducers are spaced transversely across a direction of tape transport. The transducers may be sized and disposed along an island for varying storage tape data formats, e.g., different numbers of channels, track widths, and track densities. For example, a four channel head includes four read and four write transducers spaced transversely across a tape path. The width of the read/write transducers and the distance between adjacent read/write transducers is associated with the density of tracks to be written to and read from the storage tape. Storage capacity of magnetic tapes are generally increased with the use of smaller more closely positioned read/write transducers in the tape head. Thus, as storage capacities increase, the tape head configuration and stored data formats are changed.

As the storage tape and tape drive industry evolves and achieves increases in storage capacity, the tape head and media designs continue to make changes from one generation to the next. For instance, new data formats with more densely positioned read/write transducer elements on tape heads, more densely positioned tracks on the storage tape, and thinner storage tape increases the storage capacity of storage tape devices. Format changes in the tape head and storage tape, however, generally make it difficult to read and/or write to earlier generation storage media without compromising the desired storage capacity target. For example, to increase storage capacity of storage tape, the storage tape may be thinned, e.g., lower magnetization thickness (Mrt), while narrowing and thinning the magneto resistive (MR) elements in the head. Narrowing and thinning the MR elements in the head may present reliability and durability problems when the optimized thin tape head back-reads to prior generation thick media. Therefore, to provide compatibility with multiple format storage tapes, e.g., prior generation formats, a compromise is typically made where the tape head design and storage tape format are marginalized and therefore not optimized for reliability and increased storage capacity.

In addition to marginalizing the head to preserve the ability to read earlier generation or varying formats, utilizing a completely separate back-read head may provide a system to read (or write) earlier or varying data formats. A separate back-read head, however, takes up precious space in the drive with its own set of complicated mechanics and electronics. Additionally, a separate back-read head adds cost and complexity to the media drive system.

BRIEF SUMMARY

In one aspect, a thinfilm magnetic head for writing to and reading from magnetic recording media is provided. The magnetic head includes a first set of data transducers configured transversely across a direction of tape transport, the first set of data transducers associated with a first data format, and a second set of data transducers configured transversely across the direction of tape transport, the second set of data transducers associated with a second data format, wherein the first set of data transducers and the second set of data transducers are separated by a distance along the direction of tape transport. In one example, the magnetic head includes a first raised elongated island positioned transversely across the direction of tape transport, the first island including the first set of data transducers, and a second raised elongated island positioned transversely across the direction of tape transport, the second island including the second set of data transducers.

In another example, a thinfilm magnetic head for writing to and reading from magnetic recording media includes a first raised elongated island positioned transverse to a direction of tape transport, the first island including a first set of data transducers configured for a first data format, and a second raised elongated island positioned transverse to the direction of tape transport, the second island including a second set of data transducers configured for a second data format. The first island and the second island may be separated by a slot transverse to the direction of tape transport.

According to another aspect, a method for reading from and writing to a magnetic recording media is provided. The method includes selecting one of at least two data formats of a recording head having a first set of data transducers configured transversely to a direction of tape transport and associated with a first data format, and a second set of data transducers configured transversely to the direction of tape transport and associated with a second data format, wherein the first set of data transducers and the second set of data transducers are separated by a distance along the direction of tape transport. The method further includes at least one of reading from and writing to a magnetic recording media with the selected data format.

The present invention and its various embodiments are better understood upon consideration of the detailed description below in conjunction with the accompanying drawings and claims.

DETAILED DESCRIPTION

According to one aspect, a multiple format thinfilm magneto resistive recording head is provided. The following description is presented to enable any person or ordinary skill in the art to make and use the exemplary devices and associated methods. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

In one example, a multiple format thinfilm magneto resistive recording tape head includes a first set of data transducers configured transversely across a direction of tape transport, the first set of data transducers associated with a first data format, and a second set of data transducers configured transversely across the direction of tape transport, the second set of data transducers associated with a second data format. For example, a first elongated island may include multiple read/write elements configured for the first data format and a second elongated island may include multiple read/write elements configured for the second data format. A controller may select the first or second data format to read from or write to storage tape with varying data formats.

In another example, the first and second set of data transducers may be included on a single island of a recording head. Further, any number of data formats may be included. Exemplary data formats include well known data formats, e.g., associated with Linear Tape-Open (LTO) tape, Digital Linear Tape (DLT), Super DLT (SDLT), and the like. The varying data formats may include various other known and unknown data formats, e.g., future developed data formats. Additionally, a second or third data format may be used with a first format for servo information or other purposes.

The following discussion describes examples as being particularly useful as part of a linear tape drive system utilizing thinfilm magnetic tape heads for performing read and write operations on magnetic media (such as magnetic particle tape). Additionally, the magnetic media discussed herein is magnetic recording tape. It will be understood, however, that the various examples may be useful with other magnetic storage media and devices such as hard disks, floppy disks, and the like.

Figure 1:
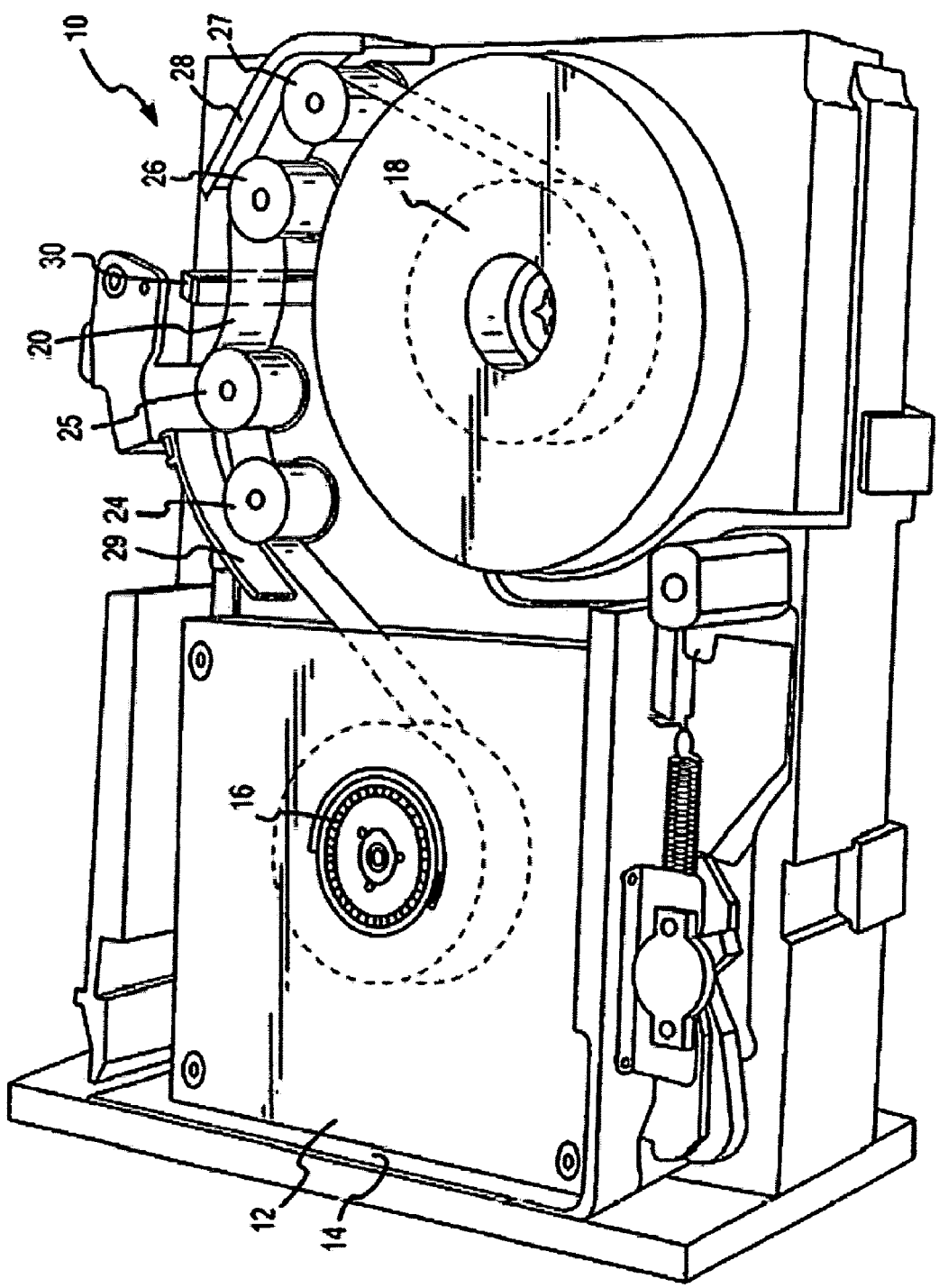
FIG. 1 illustrates an exemplary tape drive system.

FIG. 1 illustrates a cut-a-way view of a magnetic tape drive 10 in which exemplary tape heads described herein may be used. The particular arrangement of tape drive 10 is provided for completeness of the operating environment for exemplary tape heads and to facilitate description of how exemplary tape heads may be utilized during operation of a tape drive. Tape drive 10 includes a tape cartridge 12 inserted into a receiver 14. Tape drive 10 includes a motor (not shown) which drives a cartridge supply reel 16 and moves tape 20 at a particular speed (e.g., 120 inches per second or more). Tape drive 10 may also include a second motor (not shown) which drives a take-up reel 18. Proper balance of the opposing forces of the two motors produces tension on magnetic tape 20 and also produces tape motion either in or out of cartridge 12. Tape 20 may be driven in either a forward direction or a reverse direction to write data onto or read data from the tape as controlled by a motor controller circuit (not shown in FIG. 1, but typically provided on one or more printed circuit boards). The controller may also be adapted for controlling magnitudes of read/write currents passed through head 30, e.g., to select particular read/write elements for particular data formats and data tracks. Tape 20 is guided through tape drive 10 by a plurality of tape guide assemblies 24–29 between the take-up reel 18 and the cartridge 12 and past tape head 30 including a multi-format configuration of data transducers as explained in greater detail with reference to FIGS. 2–9.

Figure 2B:
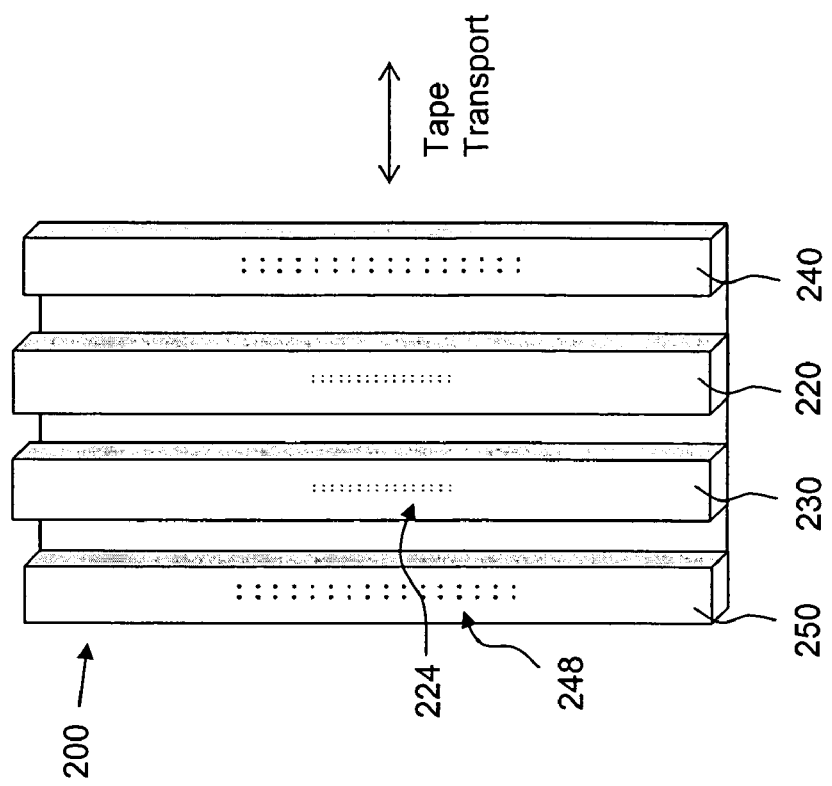
FIGS. 2A and 2B illustrate an exemplary tape head including multiple format read/write elements.
Figure 2A:
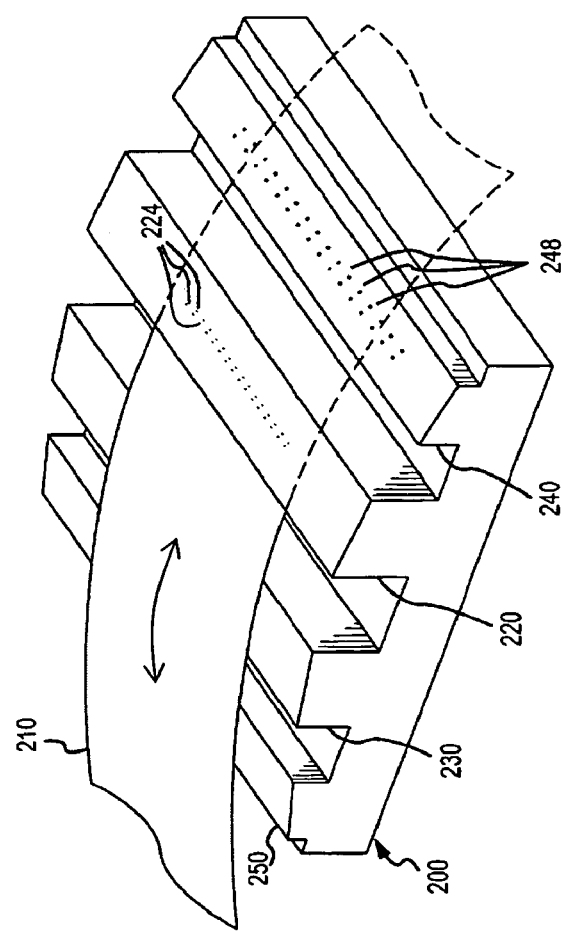

FIG. 2A illustrates a perspective view of an exemplary tape head 200 including separate data transducers or read/write elements 224 arranged according to a first data format and read/write elements 248 arranged according to a second data format. FIG. 2B illustrates a top view of exemplary tape head 200. As shown, tape head 200 is adapted for contacting media, such as magnetic particle tape.210 that typically has a width ranging from 5 to 20 millimeters. Tape head 200 may be included in a digital linear tape drive similar to drive 10 of FIG. 1. To enable reading from and writing to tape 210, tape head 200 includes raised elongated active bumps or islands 220 and 230 having read/write elements 224 disposed transversely to a direction of tape transport. The accuracy and stability of the read and write processes are controlled, in part, by a set of wrap angles that are useful for controlling contact between the tape 210 and an upper contact surface of active islands 220 and 230. The wrap angles are determined, at least in part, by the height, width, and spacing of islands 220 and 230, and outer islands 240 and 250.

Tape head 200 further includes read/write elements 248 located on outer islands 240 and 250. Islands 240 and 250 include secondary format read/write elements 248 for reading from and writing to tape 210 under a second data format, the second data format different than the first data format. Islands 240 and 250 may also increase the accuracy and stability of tape 200 by providing wear surfaces and desired wrap angles with tape head 200 similar to typical outriggers (or inactive islands).

In this example, primary format read/write elements 224 are located on the inner islands 220 and 230. In particular read/write elements 224 are merged on a single island or raised bar structure. Additionally, the secondary format read/write elements 248 are merged and embedded on islands 240 and 250. In other examples, the primary, secondary, etc. format read/write elements may be disposed in two or more clusters along one or more islands of the head structure. The height, width along the direction of tape transport, and contour of each island 220, 230, 240, and 250 may vary depending on, for example, the desired wrap angle, wear surface characteristics, and the like. Additionally, in another example, a head may include only a single primary island and a single secondary island with read/write elements configured for a first data format and a second data format respectively. For example, half of head 200 shown in FIG. 2B including only islands 220 and 240 may form a single head.

Figure 9:
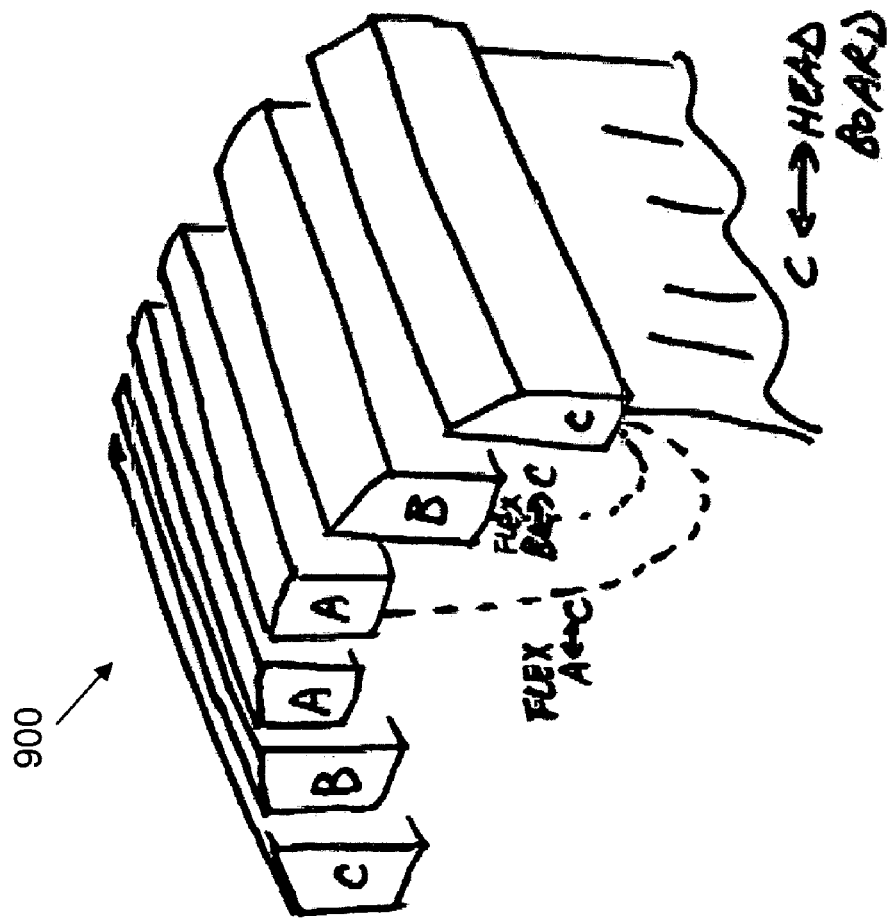
FIG. 9 illustrates an exemplary electrical connection of multiple format read/write elements of a tape head.

In operation, a controller (not shown) may send and receive signals from tape head 200 to perform read and write operations as is well known in the art. The controller may further select between read/write elements 224 and read/write elements 248 depending on the desired format. For example, if it is determined that a storage tape is recorded under a first or primary format, read/write elements 224 are selected. The controller may select read/write elements 224 or read/write elements 248 through any suitable switching circuit, firmware commands, or the like. In other examples, both read/write elements 224 and read/write elements 248 may be used simultaneously, e.g., read/write elements 248 may be used to read servo information during a read or write process by read/write elements 224. Further, read/write elements 224 and 248 of head 200 may be connected to a controller through any suitable flex-cable or the like, as shown in FIG. 9 and described in greater detail below.

A drive may determine a storage tape data format based any suitable method including, but not limited to, beginning of tape holes, directory information, data patterns or tones, cartridge auxiliary memory, cartridge features, visual inspection, and the like. Additionally, a trial-run of the various formats included in a head may be performed by the drive, where the best performing format is selected. A controller may further control various motors, tape direction and speed, tension of moving tape, read and write operations, and the like associated with a particular data format as are well known in the art.

Figure 3:
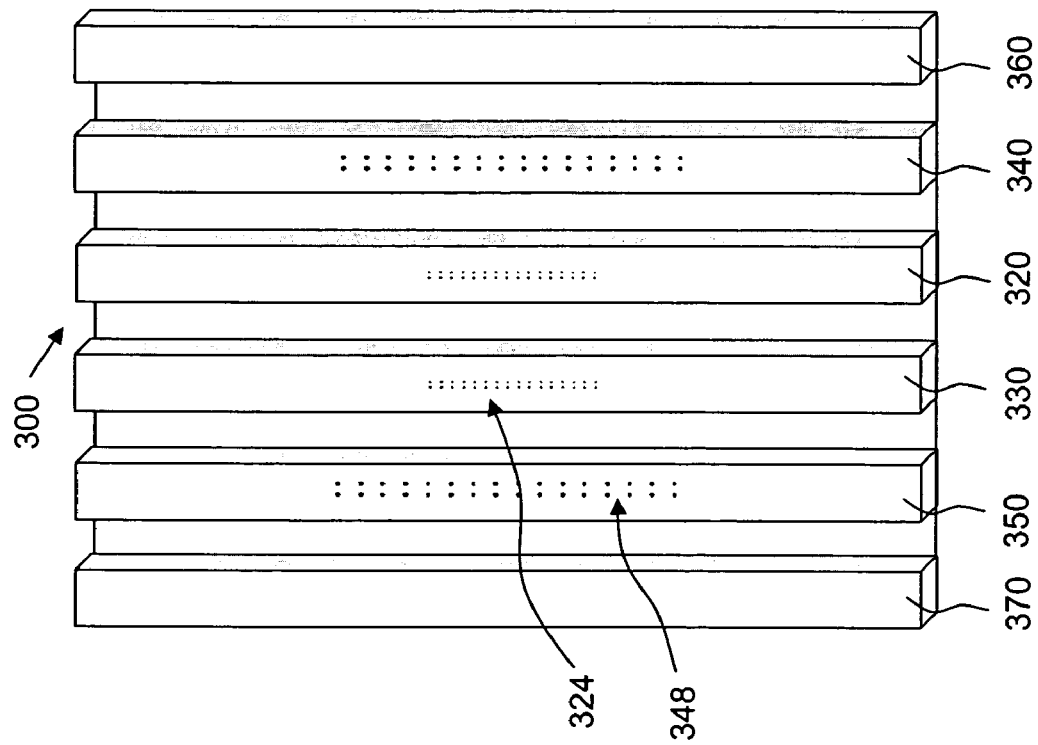
FIG. 3 illustrates another exemplary tape head including multiple format merged read/write elements.

FIG. 3 illustrates another exemplary tape head 300 having active islands 320 and 330 with read/write elements 324 of a first data format, active islands 340 and 350 with read/write elements 348 of a second data format, and inactive islands 360 and 370. Tape head 300 is similar to tape head 200 and further includes inactive islands 360 and 370, which may provide added stability by providing desired wrap angles and wear surfaces for head 300. Inactive islands 360 and 370 are generally referred to as outriggers or stabilizing rails. The height and contour of each island 320, 330, 340, 350, 360, and 370 may vary depending on, for example, the desired wrap angle and the like.

Figure 4:
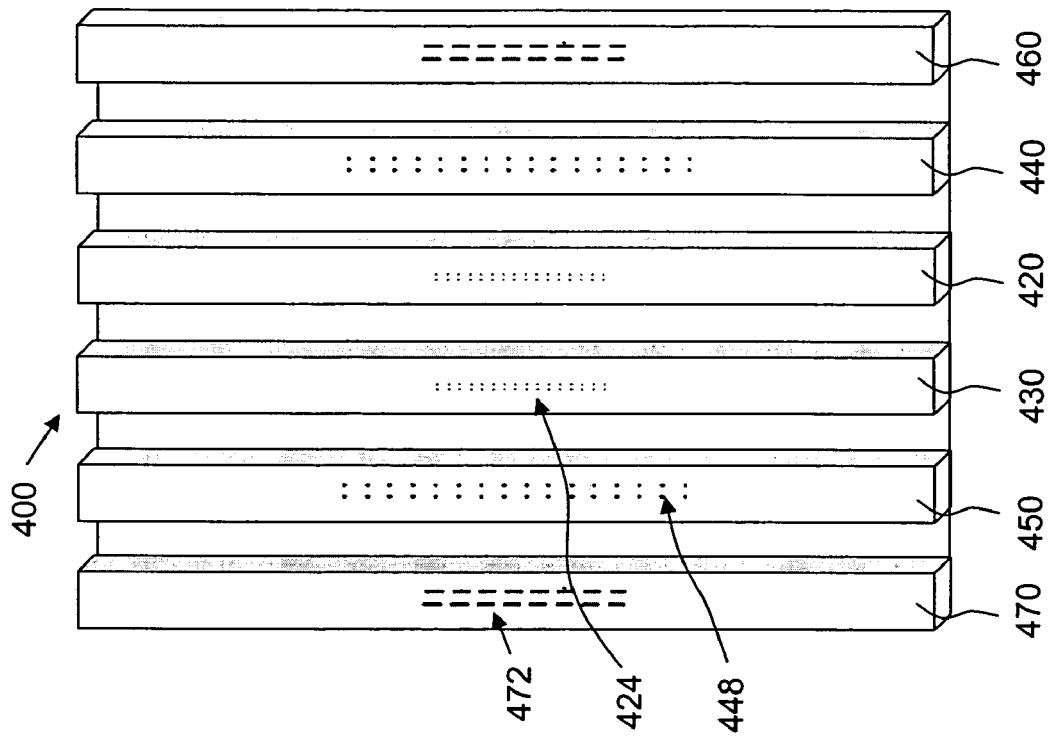
FIG. 4 illustrates another exemplary tape head including multiple format merged read/write elements.

FIG. 4 illustrates another exemplary head 400 similar to tape head 300 and further including read/write elements 472 configured for a third data format. In particular, tape head 400 includes active islands 420 and 430 with read/write elements 424 of a first data format, active islands 440 and 450 with read/write elements 448 of a second data format, and active islands 460 and 470 having merged read/write elements 472 of a third data format. In another example, additional inactive or active islands may be included beyond islands 460 and 470, e.g., serving as outriggers or additional data formats. It will be recognized by those of ordinary skill in the art that any number of active and inactive islands associated with any number of storage formats may be included with tape head 400. For example, additional active and/or inactive islands may be included with head 400 with any number of data formats. Additionally, inactive islands may be positioned as the outermost island or alternatively, between one or more active islands.

Figure 5:
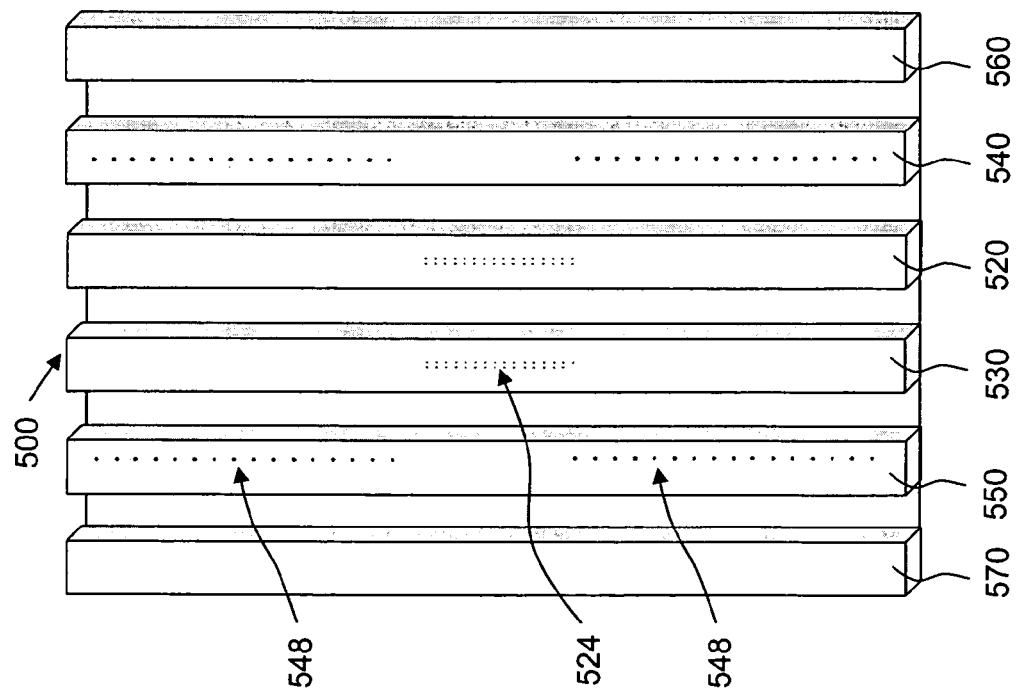
FIG. 5 illustrates another exemplary tape head including multiple format merged and dual cluster read/write elements.

FIG. 5 illustrates another exemplary tape head 500 having merged primary format read/write elements 524 on active islands 520 and 530 and dual cluster secondary format read/write elements 548 on active islands 540 and 550. Head 500 further includes inactive islands 560 and 570 disposed adjacent active islands 540 and 550.

Figure 6:
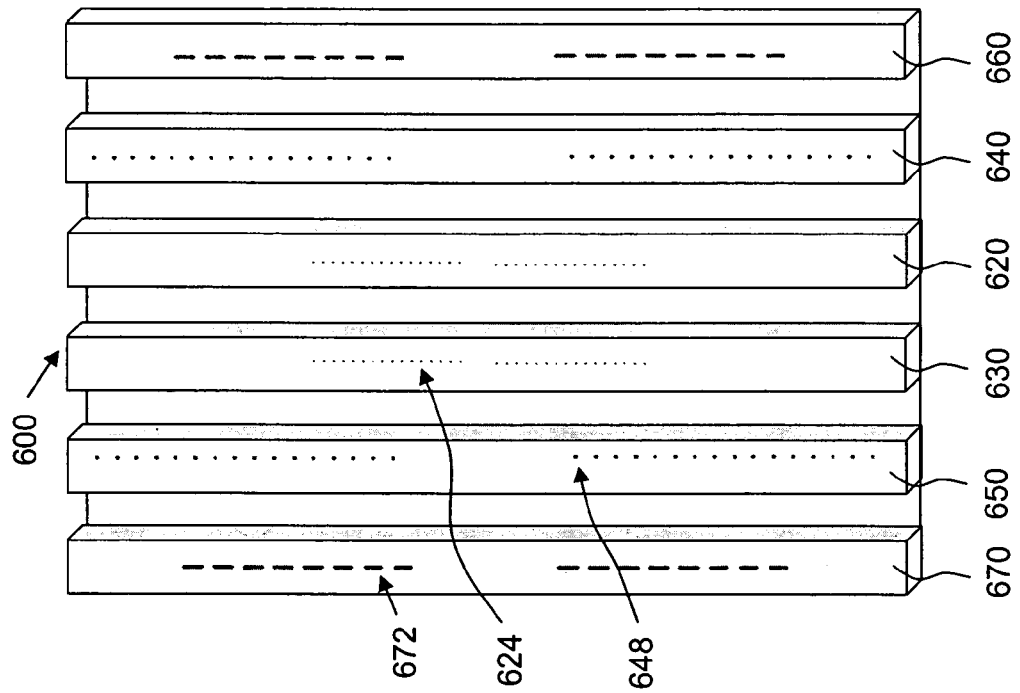
FIG. 6 illustrates another exemplary tape head including multiple format dual cluster read/write elements.

FIG. 6 illustrates another exemplary tape head 600 having primary format read/write elements 624 on active islands 620 and 630, secondary format read/write elements 648 on active islands 640 and 650, and third format read/write elements 672 on active islands 660 and 670. In this example, the first, second, and third format read/write elements include dual cluster read/write elements. It will be recognized that any combination of merged and dual cluster read/write elements with various active and inactive islands are possible. Additionally, one or more inactive islands or outriggers may be included with head 600.

Figure 7:
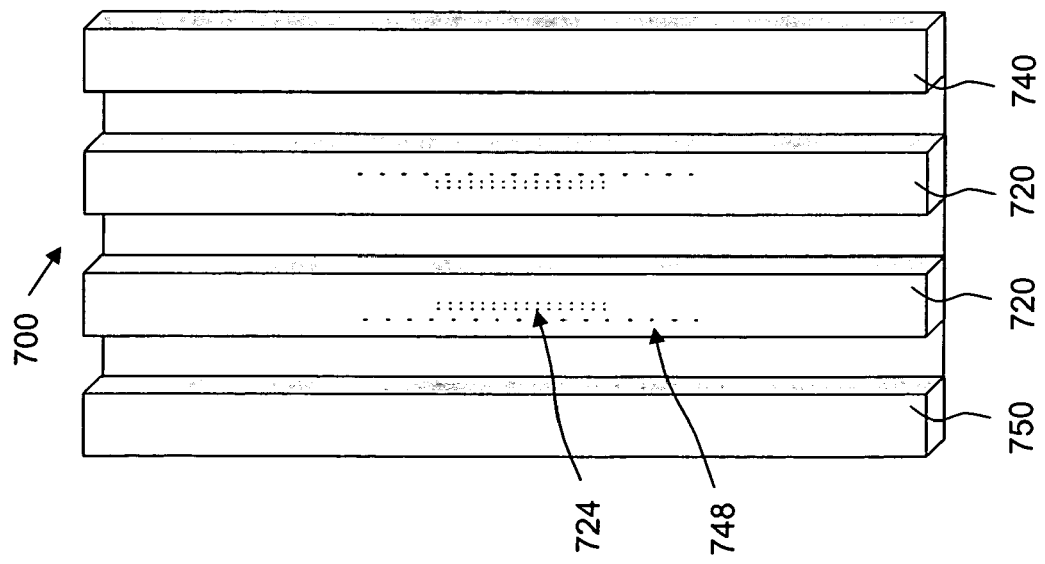
FIG. 7 illustrates another exemplary tape head including multiple format read/write elements on a single island.

FIG. 7 illustrates another exemplary tape head 700 configured as a Read-Read-Write (R-R-W) head. Tape head 700 includes merged primary data format read/write elements 724 and secondary data format read elements 748. In this instance, head 700 is capable of reading a secondary format corresponding to secondary format read elements 748. Head 700 is further capable of both reading and writing with the primary format corresponding to primary read/write elements 724. In other examples, the secondary format reading elements 724 may be disposed on separate islands from the primary format read/write elements, e.g., islands 740 and 750. Additionally, tape head 700 includes inactive islands 740 and 750 to serve as stabilizing outriggers, but in other examples inactive islands 740 and 750 may be omitted.

Figure 8:
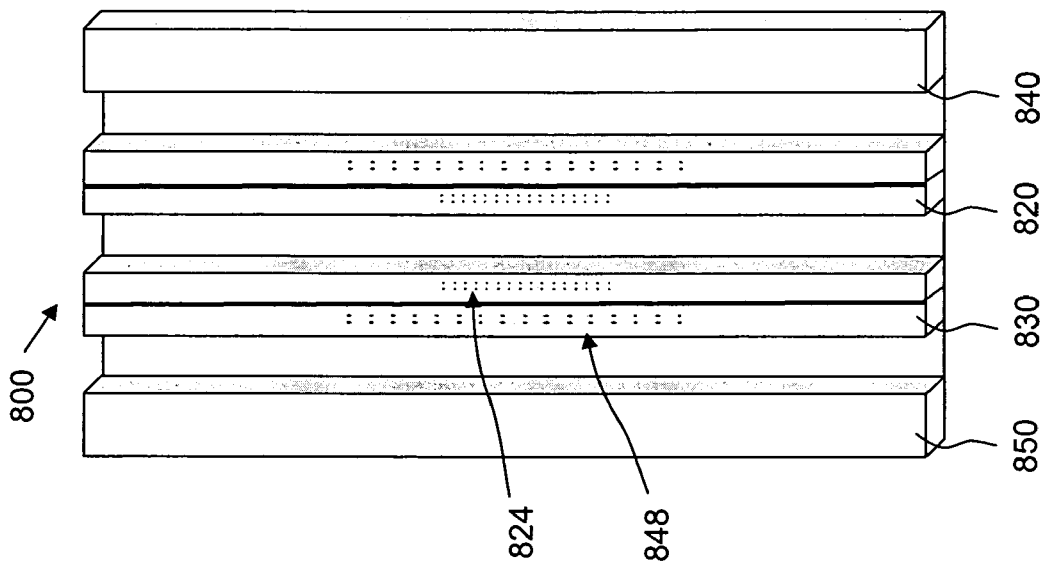
FIG. 8 illustrates another exemplary tape head including multiple format read/write elements bonded together on a single island.

FIG. 8 illustrates another exemplary tape head 800 configured as a bonded Write-Read-Read-Write (W-R-R-W) head. Tape head 800 includes merged primary format read/write elements 824 and merged secondary format read/write elements 848. The merged primary format read/write elements 824 and merged secondary format read/write elements 848, in this instance, are bonded together to form active islands 820 and 830. Tape head 800 further includes inactive islands or outriggers 840 and 850 for stability, but in other examples may be omitted or include additional devices.

The fabrication of exemplary multi-format tape heads described above may be performed utilizing any of a number of suitable thinfilm techniques previously developed and well known in the art or techniques that are still being developed. For example, thinfilm heads, such as head 200 shown in FIGS. 2A and 2B, are fabricated in clean rooms using vacuum or physical vapor deposition methods (such as RF or DC magnetron sputtering, RF or DC diode sputtering, RF or DC triode sputtering) and ion beam deposition, batch photolithographic methods (such as photoresist masking, coating, and developing), chemical assisted and reactive ion-beam etching, photoresist stripping and etching that allow for very small head and element dimensions and precise positioning and alignment of multiple transducer elements (such as elements 224). The slots or separation of the islands 220 and 240 can be achieved using laser trimming, precision grinding, or other machining techniques. Each island, such as island 220 or 240, may be fabricated by encapsulating layers of materials within two or more substrate materials followed by lapping or fine polishing to achieve a desired media contact contour and surface. Alternatively, each island may be fabricated of several segments or portions that are then epoxy-bonded together to create the elongated islands. The media contact surface may be coated with a corrosion or wear resistant thin layer to protect the read/write elements.

The resulting active island generally includes the read/write elements and is made of thin layers of different materials (such as metal alloys and insulating materials). The tape head may be configured to be a thinfilm inductive head, a thinfilm anisotropic MR head, a dual MR head, an integrated thinfilm inductive write and MR or giant magneto resistive (GMR) read head, or other thinfilm head design. The inactive islands or outriggers may be fabricated in a similar fashion to the active islands using similar materials or using different materials. Alternatively, the inactive islands may be bonded to the head and formed in differing thinfilm processes.

The number of thinfilm layers utilized in the read/write elements and the make-up of each layer may be varied depending on the particular application and design considerations. For example, the read/write elements may be fabricated with insulating layers (such as alumina) and top and bottom layers or magnetic poles of cobalt-zirconium-tantalum (CZT), which is commonly used in thinfilm heads and for which, manufacturing processes are well understood by those of ordinary skill in the arts. Poles and shields fabricated using at least one of cobalt, nickel, and iron are also useful for fabricating read/write elements. The base substrate upon which the read/write elements are built may be ferrite, aluminum oxide titanium carbide (AlTiC) or other materials. The specific materials or fabrication processes use to manufacture exemplary heads as described herein are not limited to any specific materials or fabrication processes.

In one example, a secondary format device is manufactured in a traditional process, such as a wafer insert to an AlTiC bar, where the bar is added to the head structure. The secondary format device, however, may be built with continuous wafer processing such that the secondary format device is formed on the wafer. The primary format devices may then be formed and cut as an insert for an active island. Other exemplary methods are described in U.S. Pat. No. 6,611,398, entitled "Tape Head With Support Bars," and U.S. patent application Ser. No. 10/150,676, entitled "Magnetic Tape Head with Thinfilm Thermosensors for Head-Media Interface Temperature Monitoring," both of which are incorporated by reference in their entirety as if fully set forth herein.

The interconnect scheme of exemplary heads described may include any suitable device or method. In one example, a traditional (or any other bonding technology) flex connect off each island may be used as is known in the art. A flex connection generally includes leads connected to the read/write elements of the island. In one example, an actively powered electronic gate located near the head to multiplex the channels into a flex connection may be used. Additionally, flip chips or ultrasonic bonding of the head may be used. In another example, bonding the head to a small integrated circuit board with electronic gating control may be employed.

FIG. 9 illustrates an exemplary tape head 900 including two active islands A configured for a first data format, two active islands B configured for a second data format, and two inactive islands C configured as outriggers for head 900. Read/write elements of islands A are connected through a flex connection to outrigger C and read/write elements of island B are connected through a flex connection to outrigger C, where outrigger C serves as an active gate to select the first data format or the second data format of islands A and B. Outrigger C is in turn connected to a head board or controller of head 900. It will be recognized by those of ordinary skill in the art that various other suitable interconnect schemes are possible.

Figure 10:
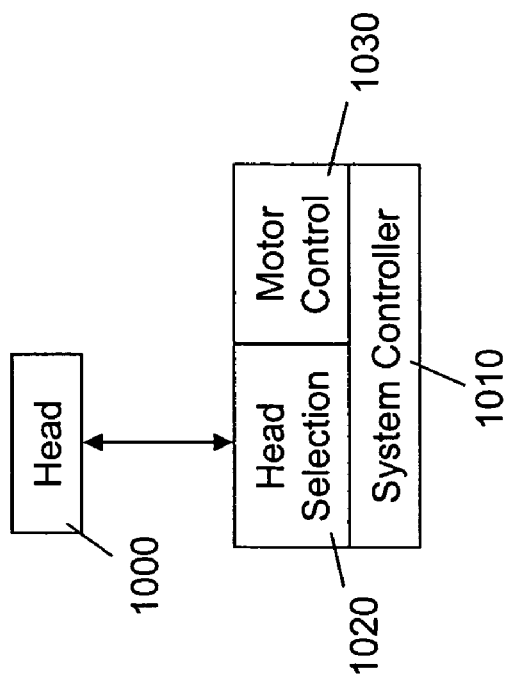
FIG. 10 illustrates an exemplary control system for selecting a format of a tape head.

FIG. 10 illustrates a block diagram of an exemplary system controller 1010 including a data format selection system 1020 connected to an exemplary head 1000, e.g., similar to tape head 900 of FIG. 9. The system controller 1010 determines the format of the storage tape to be read or the format of the storage tape to be written on. Any suitable method of determining the format of a tape to be read/written may be used, e.g., based beginning of tape holes, directory information, pitch data, manual selection, and the like. System controller 1010 sends signals to a head selection system 1020, which sends signals to and/or receives signals from read/write elements of head 1000 corresponding to the selected data format. Head selection system 1020 may be included as part of system controller 1010 or in communication with system controller 1010. Additionally, system controller 1010 sends signals to a motor control system 1030 to control the motor for the particular format, e.g., the speed and direction of the storage tape for a particular read/write process. A mode (e.g., read or write) selection system (not shown) may also be included and controlled by system controller 1010 during operation. Various aspects of the control and selection of read/write elements may be carried out in hardware, software, firmware, or combinations thereof as will be understood by those of ordinary skill in the art.

The above detailed description is provided to illustrate various examples and is not intended to be limiting. It will be apparent to those skilled in the art that numerous modification and variations within the scope of the present invention are possible. For example, various support surface contours and slot widths may be used. Further, numerous other materials and processes not explicitly described herein may be used within the scope of the exemplary methods and structures described as will be recognized by those skilled in the art. Additionally, throughout this description, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. A thinflim magnetic head for writing to and reading from magnetic recording media, comprising:
   a first raised elongated island positioned transversely across a direction of tape transport, the first island including a first set of data transducers configured transversely across the direction of tape transport, the first set of data transducers associated with a first data format; and
   a second raised elongated island positioned transversely across the direction of tape transport, the second island including a second set of data transducers configured transversely across the direction of tape transport, the second set of data transducers associated with a second data format, wherein the first set of data transducers and the second set of data transducers vary by at least one of data transducer size or spacing between adjacent data transducers.

2. The magnetic head of claim 1, wherein the first island and the second island are separated along the direction of tape transport by a slot.

3. The magnetic head of claim 1, wherein the first set of data transducers includes merged read elements and write elements.

4. The magnetic head of claim 1, wherein the first set of data transducers includes dual cluster read elements and write elements.

5. The magnetic head of claim 1, wherein the first set of data transducers is configured in a 16 channel format.

6. The magnetic head of claim 1, further comprising a third set of data transducers configured for a third data format.

7. The magnetic head of claim 1, further comprising at least one outrigger, the at least one outrigger including the second set of data transducers.

8. A thinfilm magnetic head for writing to and reading from magnetic recording media, comprising:
a first raised elongated island positioned transverse to a direction of tape transport, the first island including a first set of data transducers configured for a first data format;
a second raised elongated island positioned transverse to the direction of tape transport, the second island including a second set of data transducers configured for a second data format, wherein the second raised elongated island is the outermost raised elongated island along the direction of tape transport for contacting magnetic recording media during operation.

9. The magnetic head of claim 8, wherein the first island and the second island are separated along the direction of tape transport by a slot.

10. The magnetic head of claim 8, wherein the first set of data transducers and the second set of data transducers vary by at least one of data transducer size and spacing between adjacent data transducers.

11. The magnetic head of claim 8, wherein the first set of data transducers includes merged read elements and write elements.

12. The magnetic head of claim 8, wherein the first set of data transducers includes dual cluster read elements and write elements.

13. The magnetic head of claim 8, wherein the first set of data transducers is configured in a 16 channel format.

14. The magnetic head of claim 8, further comprising a third set of data transducers configured for a third data format.

15. A method for reading from and writing to a magnetic recording media, comprising:
selecting one of at least two data formats of a recording head having:
a first set of data transducers configured transversely to a direction of tape transport and associated with a first data format, wherein the first set of data transducers are included with a first raised elongated island positioned transversely to the direction of tape transport, and
a second set of data transducers configured transversely to the direction of tape transport and associated with a second data format, wherein the first set of data transducers and the second set of data transducers are separated by a distance along the direction of tape transport, and the second set of data transducers are included with a second raised elongated island positioned transversely to the direction of tape transport, wherein the second raised elongated island is the outermost raised elongated island along the direction of tape transport for contacting magnetic recording media during operation; and
at least one of reading from and writing to a magnetic recording media with the selected data format.

16. The method of claim 15, further comprising determining a data format of data stored on the recording media.

17. The method of claim 15, further comprising setting a data format of data stored on the recording media.

18. The method of claim 15, wherein the first island and the second island are separated along the direction of tape transport by a slot.

19. The method of claim 15, wherein the first data format and the second data format vary by at least one of track width and spacing between adjacent data tracks.

20. The method of claim 15, wherein the first set of data transducers includes merged read elements and write elements.

21. The method of claim 15, wherein the first set of data transducers includes dual cluster read elements and write elements.

22. The method of claim 15, wherein the first set of data transducers is configured in a 16 channel format.

23. The method of claim 15, wherein the recording head further includes a third set of data transducers configured for a third data format.

24. A thinfilm magnetic head for writing to and reading from magnetic recording media, comprising:
first and second raised elongated islands positioned transversely across a direction of tape transport, the first and second raised elongated islands including a first set of data transducers associated with a first data format; and
third and fourth raised elongated islands positioned transversely across a direction of transport and on opposite sides of the first and second raised elongated islands, the third and fourth raised elongated islands including a second set of data transducers, the second set of data transducers associated with a second data format.

25. The magnetic head of claim 24, wherein the first set of data transducers and the second set of data transducers vary by at least one of data transducer size or spacing between adjacent data transducers.

26. The magnetic head of claim 24, wherein the third and fourth raised elongated islands including the second set of data transducers are the outermost structure along the direction of tape transport for contacting magnetic recording media during operation.

27. A thinfilm magnetic head for writing to and reading from magnetic recording media, comprising:
a first set of data transducers configured transversely across a direction of tape transport, the first set of data transducers associated with a first data format; and
a second set of data transducers configured transversely across the direction of tape transport, the second set of data transducers associated with a second data format, wherein the second set of data transducers are included with a raised elongated island, the raised elongated island separated from the first set of data transducers by a slot extending transversely to the direction of tape transport, wherein the raised elongated island is the outermost raised elongated island along the direction of tape transport for contacting magnetic recording media during operation.

28. The magnetic head of claim 27, wherein the first set of data transducers are included with a raised elongated island.

29. The magnetic head of claim 27, wherein the first set of data transducers and the second set of data transducers vary by at least one of data transducer size or spacing between adjacent data transducers.

* * * * *